United States Patent
Chopdekar et al.

(10) Patent No.: US 11,640,586 B2
(45) Date of Patent: May 2, 2023

(54) SYSTEMS AND METHODS FOR PROVIDING ELECTRONIC EVENT INFORMATION

(71) Applicant: Avaya Management L.P., Durham, NC (US)

(72) Inventors: Sandesh Chopdekar, Pune (IN); Valentine C. Matula, Granville, OH (US); Pushkar Yashavant Deole, Pune (IN); Navin Daga, Silapathar (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/220,485

(22) Filed: Apr. 1, 2021

(65) Prior Publication Data

US 2022/0318761 A1 Oct. 6, 2022

(51) Int. Cl.
*G06Q 10/10* (2012.01)
*G06Q 10/1093* (2023.01)
*G06F 9/54* (2006.01)
*G06F 3/04845* (2022.01)
*G06F 3/0482* (2013.01)

(52) U.S. Cl.
CPC ....... *G06Q 10/1095* (2013.01); *G06F 3/0482* (2013.01); *G06F 3/04845* (2013.01); *G06F 9/542* (2013.01); *G06F 9/543* (2013.01); *G06F 9/547* (2013.01)

(58) Field of Classification Search
CPC .................................................. G06Q 10/1095
See application file for complete search history.

(56) References Cited

U.S. PATENT DOCUMENTS

| | | | |
|---|---|---|---|
| 8,019,069 B1* | 9/2011 | Cyriac | H04M 3/563 379/202.01 |
| 9,021,118 B2 | 4/2015 | John et al. | |
| 9,112,978 B2 | 8/2015 | Gilbert et al. | |
| 9,112,979 B2 | 8/2015 | Gilbert et al. | |
| 9,253,330 B2 | 2/2016 | Boss et al. | |
| 9,402,104 B2 | 7/2016 | John et al. | |
| 9,774,825 B1 | 9/2017 | John et al. | |
| 2007/0008911 A1* | 1/2007 | MacFarlane | G06Q 10/025 370/260 |
| 2009/0083694 A1* | 3/2009 | Argott | G06Q 10/1095 705/7.19 |

(Continued)

OTHER PUBLICATIONS

Official Action with machine translation for France Patent Application No. 2202749, dated May 24, 2022 4 pages.

(Continued)

*Primary Examiner* — Roland J Casillas
(74) *Attorney, Agent, or Firm* — Sheridan Ross P.C.

(57) ABSTRACT

Systems and methods include generating an electronic calendar item associated with an event, generating an invitation associated with the electronic calendar item, the invitation comprising: a first option associated with one or more of conditional attendance and a portion of desired attendance; and a second option associated with one or more of a type of attendance; sending the invitation; receiving a response to the invitation, the response comprising a selection associated with one or more of the first option and the second option; and based on the selection, performing one or more actions associated with the event.

20 Claims, 9 Drawing Sheets

(56) References Cited

U.S. PATENT DOCUMENTS

| | | | |
|---|---|---|---|
| 2010/0235216 A1* | 9/2010 | Hehmeyer | G06Q 10/06316 705/7.26 |
| 2015/0249747 A1* | 9/2015 | Boss | H04M 3/565 379/85 |
| 2020/0258029 A1 | 8/2020 | Jung et al. | |
| 2020/0334642 A1 | 10/2020 | Vaananen | |

OTHER PUBLICATIONS

Official Action for U.S. Appl. No. 17/461,383, dated May 11, 2022 12 pages.
Official Action with machine translation for France Patent Application No. 2208447, dated Oct. 11, 2022 6 pages.
Notice of Allowance for U.S. Appl. No. 17/461,383, dated Oct. 21, 2022 10 pages.

* cited by examiner

300

Event Settings: Cooking 101     X

| New Event | Save | Cancel | Edit Existing Event |

Event Title: Cooking 101
Required Invitees: Ann, David, Diego, Emily
Optional Invitees: Brooke
Start time: 9 AM, December 21     Organizer: Lauren
End time: 2 PM, December 21
Location: The Kitchen

Configuration Settings

Topics Covered:    Set Times
- Setting the table    9am – 9:30am
- Marinating ingredients    9:30am – 10am
- Salad making
- Grilling    12pm – 1pm
- Desserts    1pm – 1:30pm
- Serving
- Cleaning up    [Edit]

Keywords
- Cooking • Pie
- Cleaning • Place settings
- Chicken • Vegetables
- [Edit]

Event Options
✓ Live Transcription
✓ Live Viewing
✓ Live Audio
☐ Saving of Transcription
☐ Saving of Video
☐ Saving of Audio
✓ Partial/Selective Attendance
✓ Avatars

Event Speakers     Speaking Time
Lauren
Robert     12pm – 1pm
Francis

FIG. 3

Event Invitation: Cooking 101     [X]

When: December 21, 9 am – 2 pm
Where: The Kitchen
Organizer: Lauren
Invitees: Ann, Brooke*, David, Diego, Emily

Topics Covered:     Set Times
- Setting the table    9am – 9:30am
- Marinating ingredients   9:30am – 10am
- Salad making
- Grilling     12pm – 1pm
- Desserts    1pm – 1:30pm
- Serving
- Cleaning up    [Edit]

Potential Conflicts:
Call with Joe 8 am – 8:50 am
Lunch with Jaron: 11:30 am
Workout Class: 2:30 pm

Keywords
- Dessert
- Cooking    • Place settings
- Cleaning    • Vegetables
- Chicken    • [Edit]

Event Speakers     Speaking Time
Lauren
Robert     12pm – 1pm
Francis

Respond: [ATTEND] [DECLINE] [MAYBE] [PARTIAL/SELECTIVE/REMOTE]

Event Invitation: Cooking 101

When: December 21, 9 am – 2 pm
Where: The Kitchen
Orga
Invit

Partial/Selective/Remote Attendance Options

- Interested in particular time windows
- Interested in particular topics
- Interested in particular keywords
- Interested in particular speakers
- Interested in full event
- Participate on condition of non-attendance of other user Save Choices      Cancel

Topics
- Set
- Mar
- Sal
- Gril
- Des
- Ser
- Cle

Keywo
- Co
- Cle
- Chicken

Respond: ATTEND  DECLINE  MAYBE  PARTIAL/SELECTIVE/REMOTE

FIG. 4B

Event Invitation: Cooking 101

When: December 21, 9 am – 2 pm
Where: The Kitchen

Partial/Selective/Remote Attendance Options

- ☐ In person attendance
- ☐ Remote audio only
- ☐ Remove audio/video
- ☑ Remote live transcription
- ☐ Post-meeting audio
- ☑ Post-event audio/video
- ☐ Post-event transcription

[ Save Choices ]   [ Cancel ]

Respond: [ATTEND] [DECLINE] [MAYBE] [PARTIAL/SELECTIVE/REMOTE]

Event Notification: Cooking 101

When: December 21, 9 am – 2 pm
Where:
Who:

Partial/Selective/Remote Attendance Notification

PARTIAL ATTENDANCE CONDITION MET:
<u>DESSERT MENTIONED</u>

JOIN EVENT

JOIN AUDIO

VIEW LIVE TRANSCRIPTION

SEND TRANSCRIPTION,
AUDIO, AND/OR VIDEO AFTER
THE EVENT

<u>Topics</u>
- Settin
- Marin
- Salad
- Grillin
- Desse
- Servi
- Clear

<u>Keyword</u>
- Cook
- Clear
- Chick

SYSTEMS AND METHODS FOR PROVIDING ELECTRONIC EVENT INFORMATION

FIELD

The disclosure relates generally to electronic calendaring applications and more particularly to providing electronic calendar event information in a user-friendly manner.

BACKGROUND

As electronic user devices such as smartphones, tablets, computers, etc., become more commonplace, more and more communication between people occurs electronically. The Internet has enabled real-time spread of information.

Using electronic calendar applications, such as Google Calendar™ and Outlook™, users are benefitted with the ability to schedule events for many people with minimal interactions. Calendar items relating to events are created using calendar applications and invitations to such meetings are often sent using email.

With the growing use of calendar applications, events such as office meetings have become simple to schedule. As a result, users such as employees of businesses are increasingly busy with meetings.

Many times, a user may be invited to a meeting in which only a portion of the meeting will likely be beneficial. Such users may sit in a meeting for some time before a discussion which applies to the users begins and the users may be forced to sit quietly for a remainder of a meeting until the meeting officially ends.

The advent of remote viewing has enabled users to be productive until minutes before a meeting begins—as opposed to being required to physically travel to a meeting place. Remote viewing has thus saved many users a great deal of time.

Normally when a meeting invitation is sent using a conventional calendar application, the receiver has three options, i.e., accept, decline, or let the organizer know the receiver may or may not attend the meeting. There are several disadvantages to such a conventional calendar application. For example, if a user wants to join the meeting or event only for a certain topic which will be discussed during the meeting for a short duration, e.g., five to ten minutes, the user cannot adequately respond given the limited choices. This impacts productivity as the user unnecessarily needs to listen to topics, which are of not much use. Other participants who can see that the user accepted may believe that the participant will be in attendance for the entire meeting. Also, the organizer of the meeting may wait for the participant to arrive when in fact the person has no intent of joining the meeting at the beginning.

As should be appreciated, existing solutions to electronic calendaring applications, involving sitting through entire meetings is unproductive. Presently available solutions do not enable users to focus only on relevant topics and provide moderators and others a false impression that each attending user will be in attendance for the meeting resulting in wasted time as a moderator waits for every participant to join at the start of the meeting.

What is needed is an electronic calendar application capable of resolving the above described issues with conventional electronic calendar applications.

BRIEF DESCRIPTION OF THE DRAWINGS

FIGS. 3, 4A, 4B, 4C, 5, and 6 are illustrations of user interfaces in accordance with one or more embodiments of the present disclosure;

DETAILED DESCRIPTION

Figure 1:
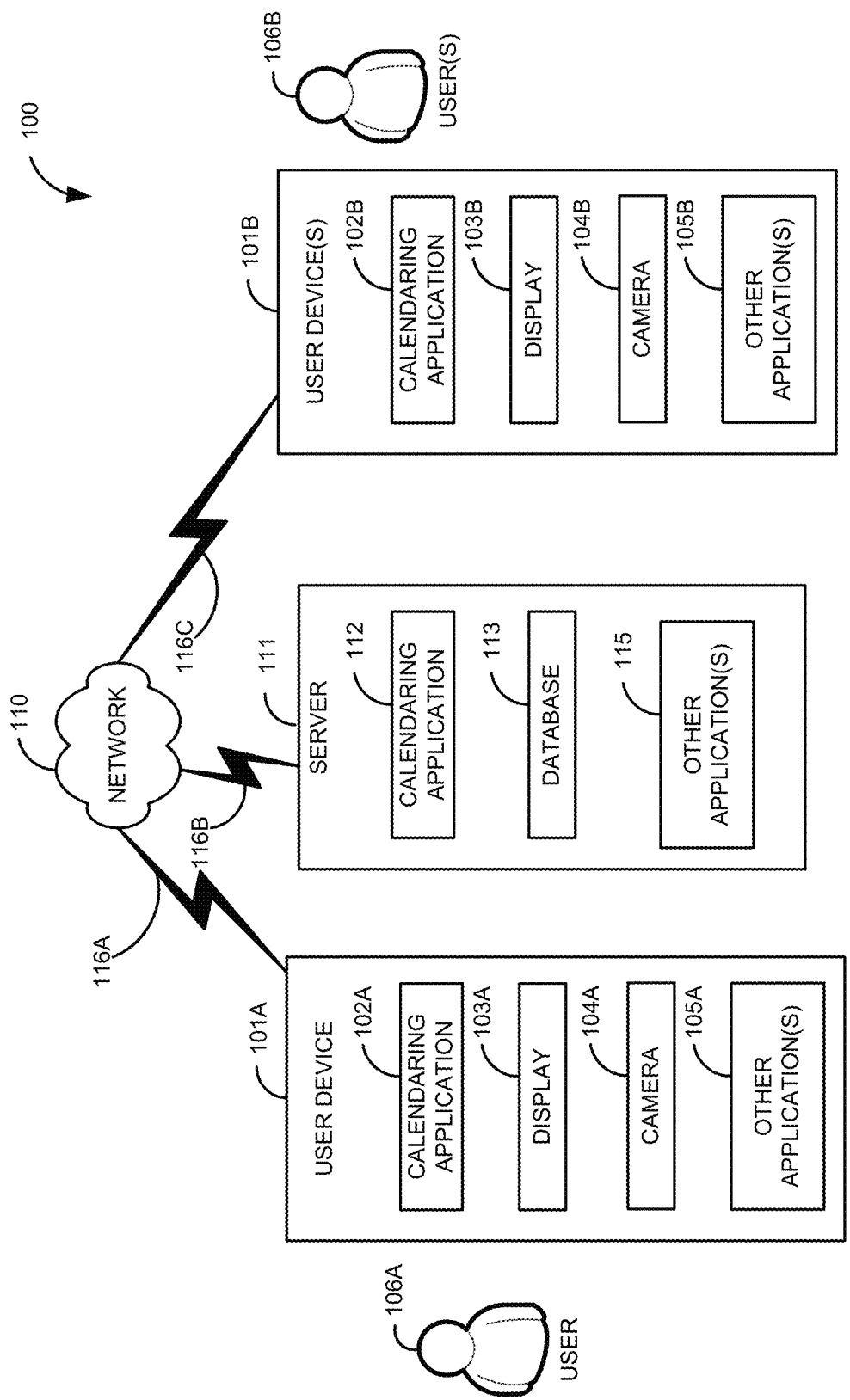
FIG. 1 is a block diagram of a first illustrative system for implementing an electronic calendar application in accordance with one or more embodiments of the present disclosure.

The above discussed issues with contemporary calendar applications and other needs are addressed by the various embodiments and configurations of the present disclosure. As described herein, a calendaring application may enable users to respond to electronic calendar application event invitations in a more intuitive and useful manner. Systems and methods described herein also enable users to attend events organized using electronic calendar applications in a more efficient manner. Such a system as described herein provides a rich experience to users of an electronic calendar application.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer readable mediums may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 capable of creating electronic calendar items associated with events with calendaring applications, sending electronic invitations, and receiving responses to electronic invitations to organize the flow of data relating to events between one or more users in accordance with one or more of the embodiments described herein. A first illustrative system 100 comprises user communication devices 101A, 101B and a network 110. In addition, users 106A-106B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. Although only two user communication devices 101A, 101B are shown for convenience in FIG. 1, any number of user communication devices 101 may be connected to the network 110 for establishing an event such as a web-conference, video communication, or text-based communications.

The user communication devices 101A, 101B further comprise electronic calendaring applications 102A, 102B, displays 103A, 103B, and cameras 104A, 104B. It should be appreciated that, in some embodiments, user devices may lack cameras 104A, 104B. Also, while not shown for convenience, the user communication devices 101A, 101B typically comprise other elements, such as a microprocessor, a microphone, a browser, other applications, and/or the like.

In addition, the user communication devices 101A, 101B may also comprise other application(s) 105A, 105B. The other application(s) 105A can be any application, such as, a slide presentation application, a document editor application, a document display application, a graphical editing application, a calculator, an email application, a spreadsheet, a multimedia application, a gaming application, and/or the like. The communication applications 102A, 102B can be or may include any hardware/software that can execute an electronic calendar application that is displayed to users 106A or 106B. For example, the communication applications 102A, 102B can be used to execute and display an electronic calendar application.

The displays 103A, 103B can be or may include any hardware display or projection system that can display an image of a video conference, such as a LED display, a plasma display, a projector, a liquid crystal display, a cathode ray tube, and/or the like. The displays 103A-103B can be used to display user interfaces as part of communication applications 102A-102B.

The user communication devices 101A, 101B may also comprise one or more other applications 105A, 105B. The other applications 105A, 105B may work with the electronic calendar applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication such as interactions using the electronic calendar applications. Data 116A may be sent and/or received via user device 101A, data 116B may be sent and/or received via server 111, and data 116C may be sent and/or received via user device 101B.

The server 111 may comprise any type of computer device that can communicate on the network 110, such as a server, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for managing electronic calendar application items.

The server 111 may further comprise an electronic calendar application 112, database(s) 113, other application(s) 115, and, while not shown for convenience, other elements such as a microprocessor, a microphone, a browser application, and/or the like. In some embodiments, machine learning and/or natural language processing algorithms may be executed by the server or other devices to carry out the work of processing event data such as transcribing audio from a live event, while in other embodiments, the server or another device may access one or more third party services provided by, for example, one or more cloud service providers for machine learning and/or audio processing for processing data. In some embodiments, a combination of server-executed artificial intelligence systems and third party-based systems may be used.

Figure 2B:
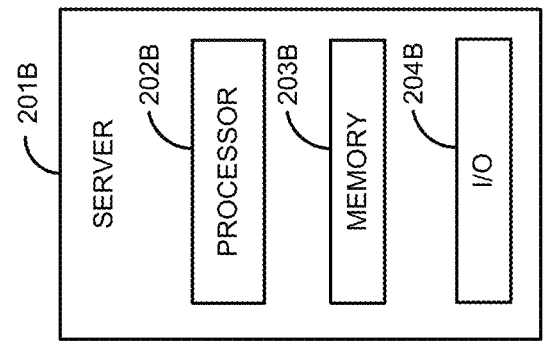
FIG. 2B is a block diagram of a server for executing an electronic calendar application in accordance with one or more embodiments of the present disclosure.
Figure 2A:
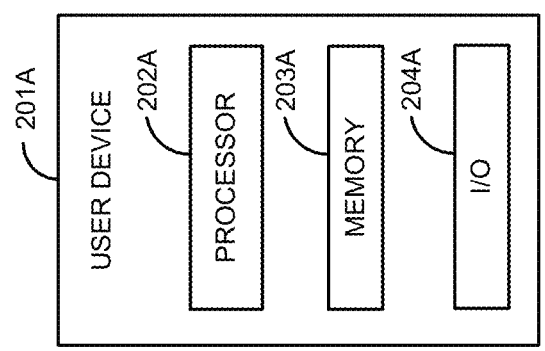
FIG. 2A is a block diagram of a user device system for executing an electronic calendar application in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise one or more processors and/or microprocessors. As used herein, processor may refer to a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, keyboards, mice, microphones, cameras, display devices, network cards, etc.

Illustratively, the user communication devices 101A, 101B, the calendar applications, the displays, the application(s), are stored-program-controlled entities, such as a computer or microprocessor, which performs the methods and the processes described herein by executing program instructions stored in a computer-readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

FIG. 3 is an illustration of a user interface 300 for creating an electronic calendar items in accordance with one or more embodiments of the present disclosure. As should be appreciated by the illustration of the user interface 300 of FIG. 3, an event creation user interface may comprise user-interactable graphical user interface ("GUI") elements enabling a user to create an electronic calendar item.

An electronic calendar item may be associated with a physical event such as a meeting. A physical event may be a live group of people or may be a virtual event such as a telephone call, video conference, etc. A physical event may last a particular amount of time, such as five minutes or two weeks. It should be appreciated the systems and methods described herein may be used to organize any type of event.

An electronic calendar item may comprise one or more data packets stored in memory of one or more computing systems. An electronic calendar item may comprise data including, but not limited to, a beginning date and time of an event associated with the electronic calendar item, a title of the event, an ending date and time of the event, an identity of an organizer of the event, a list of invitees for the event, etc.

As illustrated in FIG. 3, an event creation user interface may comprise GUI elements such as buttons and text fields. Using an event creation user interface such as that illustrated in FIG. 3, a user may create an electronic calendar item associated with, for example, a physical or virtual event.

Using the event creation user interface 300 of FIG. 3, a user may enter information such as a start date and time, an end date and time, a list of invitees, and/or other information. Using the user interface 300, a user may set one or more settings associated with the event associated with the electronic calendar item. For example, the user may enable or disable settings such as allowing a live, automatic transcription of audio during the event, allowing remote viewers to spectate and/or participate during the event, allowing the saving of transcriptions, video, and/or audio of the event, and enabling and disabling other features.

Using the user interface 300, a user may be enabled to include one or more tags associated with the event. For example, the user may enter one or more tags describing topics to be discussed during the event. In some embodiments, tags may be associated with a particular time. For example, a user arranging a conference call may tag an introduction section of the call as being the first ten minutes of the call. Tags may be associated with an instance of time, such as ten minutes into the call, or may be associated with a range of time, such as from the beginning of the call until ten minutes.

In some embodiments, an electronic calendar item may include a schedule of topics to be discussed. For example, a user arranging a meeting may list out the topics to be discussed. The topics may be arranged based on an order of discussion. The topics may be associated with times at which the topics will be discussed. For example, a topic may show that the topic will be covered from noon until two pm or for the last fifteen minutes of the event.

In the example illustrated in FIG. 3, an event is being planned. Using an electronic calendaring application, an organizer has begun a process of creating an electronic calendar item associated with the event. The organizer has titled the event Cooking 101. The user interface 300 includes a "new event" button enabling a user to create a new calendar item, a "save" button enabling a user to save the current electronic calendar item, a "cancel" button to cancel the current electronic calendar item, an "edit existing event" to open an existing electronic calendar item and edit one or more attributes of the item.

Item attributes may include, but should not be considered as being limited to, an event title, required invitees, optional invitees, organizers, start time and date, end time and date, location, etc. An event creation user interface 300 may also include user-adjustable configuration. For example, using an event creation user interface 300, a user may input one or more topics to be covered during the event. Topics may or may not be associated with a time or timeframe. An event creation user interface may also include one or more keywords. Keywords may be, for example, words which may be expected to be mentioned during the event associated with the calendar item.

In the example illustrated in FIG. 3, keywords including cooking, cleaning, chicken, pie, place settings, and vegetables have been entered by the organizer. Using the user interface 300, the organizer may be enabled to edit the keywords for the event.

An event creation user interface 300 may include one or more user-configurable settings for the calendar item. For example, an organizer may be enabled to enable or disable live transcription, live viewing, live audio, saving of transcription, saving of video, saving of audio, partial and/or selective attendance, avatars for remote viewers, and other options.

An event creation user interface 300 may include a list of speakers expected to participate in the event associated with the calendar item. Event speakers may be listed with or without an expected time of speaking or time window.

Each of the settings, information, and other items of data within the event creation user interface 300 may be saved as part of a new calendar item. In some embodiments, upon creating a new calendar item, invitations to the event associated with the calendar item may automatically be sent out to users via, for example, email.

FIG. 4A is an illustration of a user interface 400 for an event invitation in accordance with one or more embodiments of the present disclosure. When an organizer creates a new calendar item or invites users to an existing calendar item, the invited users may receive an invitation via email. The invitation may be viewed using a calendar application. Opening a calendar application, a user may view a start time, end time, a location, an indication of an organizer of the event or calendar item, a listing of other invitees to the event or calendar item, a listing of topics to be covered during the event, a listing of keywords which may be discussed during the event, a listing of speakers planning to speak during the event, a listing of potential conflicts the invitee has during the time of the event, and options for responding.

The user interface 400 for the event invitation may include a listing of topics to be covered during the event. The listing of the topics to be covered during the event may include a start time or a time window during which the topic is scheduled to be discussed. The times associated with the listing of the topics may be set by the organizer during the creation of the calendar item. It should be appreciated that the listing of topics may be an incomplete list and that other topics may be discussed during an event. As opposed to or in addition to topics, other time-scheduled things may be listed, such as sub-events which are scheduled to occur during an event.

The user interface 400 for the event invitation may include a listing of keywords which may be discussed during the event. In some embodiments, an invitee may be enabled to edit the listing of keywords. Keywords added by an invitee may in some embodiments be presented to the organizer as a requested keyword.

The user interface 400 for the event invitation may include a listing of speakers to speak during the event. Speakers may be listed with or without an indication of a speaking time. For example, the invitation may include a schedule of speakers for the event or may include only a list of speakers.

The user interface 400 for the event invitation may include a listing of any potential conflicts for the invitee. The event invitation may show any events on the invitee's calendar beginning or ending within an amount of time prior to, during, or after the event associated with the calendar item. For example, the invitation may show any event ending within five minutes of the start time of the event associated with the calendar item, any event beginning less than five minutes after the end time of the event associated with the calendar item, as well as any event overlapping in time with the event associated with the calendar item.

The user interface 400 for the event invitation may include GUI elements enabling a user to respond to the event invitation. In some embodiments, the GUI elements may include a GUI element for attend, decline, maybe, partial attendance, selective attendance, and/or remote attendance.

When a user receives a meeting invite, in addition to accept, decline, and tentative or maybe, the invitation may allow one or more additional options for the user to select. For example, a selective attendance option may be used to indicate that the user is not interested in attending the entire meeting but only a specific section of the meeting. When the user accepts the meeting using a selective option, the meeting application may then allow the user to specify the topics of interest, or any keywords/phrases that the user is interested in, as illustrated in FIG. 4B.

FIG. 4B is an illustration of a user interface 450 for an event invitation which may be presented to an invitee haven chosen to partially, selectively, remotely in accordance with one or more embodiments of the present disclosure. The user interface 450 may be displayed following an invitee choosing to partially, selectively, and/or remotely attend the event associated with the calendar item. In some embodiments, such a user interface 450 may include one or more GUI elements enabling a user to choose between one or more of interested in one or more particular time windows, interested in one or more particular topics, interested in one or more particular speakers, and interested in the full event. In some embodiments, a user may choose to participate on condition of non-attendance of other users. For example, the user may say they will attend only if a particular other person does not attend. Such a feature may enable users such as subject matter experts to attend only if needed—that is, if no other subject matter expert is attending.

Selecting one of the GUI elements illustrated in the user interface 450 may display a user-interactive list of the time windows, topics, keywords, speakers, etc. for the user to select between. For example, if the user selects interest in one or more particular topics, the user may be shown a user interface listing the topics included in the calendar item. The user may then select one or more of the topics.

FIG. 4C is an illustration of a user interface 450 for an event invitation which may be presented to an invitee haven chosen to partially, selectively, remotely in accordance with one or more embodiments of the present disclosure. The user can alternatively make a request to the meeting organizer to pull him in the meeting when the specific topic, phrases, and/or keywords are going to be discussed. In some embodiments, a user may be presented with an option related to recording of the event associated with the calendar item. When the user selects this option, the meeting can be recorded and once the meeting is finished a copy of the link where the recording is kept will be emailed or otherwise messaged to the user. For selective mode, the user may also be provided an option to provide only segments of interest, e.g., only (or also) provide recording segments, where the topic of interest is discussed, or the link can be sent to all users depending upon the system configuration. Note the participant may say that they are interested in topics B and D of a meeting, but ask for recordings of A and C, for example. Or A, B, and D. Or anything that is on agenda (or, B, D, and everything that was off-agenda), etc.

As illustrated in FIG. 4C, the user interface 450 may comprise one or more GUI elements enabling a user such as an invitee to choose between in-person attendance, attending via remote audio only, attending via remote video with or without audio, and/or attending via a live transcription of the audio. In some embodiments, livestreaming of the audio, video, and/or transcription can be implemented using instant messaging applications such as Slack, Skype, or a conference client.

The user interface 450 illustrated in FIG. 4C may comprise one or more GUI elements enabling a user such as an invitee to choose between receiving information after the event in addition to or instead of attending the event. For example, a user may select between receiving post-event audio, post-event video with or without audio, and/or post-event transcription.

In some embodiments, a conferencing system can allow several options to be system wide. Allowing user to be represented by an avatar when they are receiving live information such as a transcript or live video. Users may be enabled to configure their avatars in using an account profile.

For events in which one or more users have selected being interested in only one or more topics, each user may be brought into the event when one of the user's selected topics have been mentioned or have been scheduled to be discussed. For example, in some embodiments, an event monitoring system may analyze audio of an event to determine when a topic has been mentioned. If an organizer has described a schedule for the discussion of topics, a clock may be used to bring in users at the designated time for each user's selected topic.

Similarly, if a user is interested in hearing only from one or more speakers, the event monitoring system may be used to determine when the selected speaker or one of the selected speakers has begun to speak. If an organizer has described a schedule for the speakers, a clock may be used to bring in users at the designated time for each user's selected topic.

As events take place, a monitoring system, such as an application executing on a computer system may be used to process audio of the event to determine whether a topic, keyword, or phrase has been uttered or whether a particular speaker has begun to speak. Any number of possible audio analysis systems may be used, such as a speech analysis artificial intelligence system.

During an event, when a user's selected condition, such as the mentioning of a keyword or a particular speaker speaking, occurs, the user may be notified. For example, a popup window may display via a calendaring application on a computer associated with the user. In some embodiments, the user may automatically be joined with the event. A user may, in addition to or instead of choosing to join an event, choose to receive either a transcript or a recording of the event.

Transcripts of events may be automatically generated by a monitoring system for example by using an automatic speech recognition system. If a user selects to receive only a portion of a transcript of an event based on the utterance of a topic or the speaking of a given speaker, the monitoring system may automatically edit the transcript to crop out portions of the transcript of the event to leave only the portions relating to the topic or the speaker. The cropping of the transcript may comprise removing portions a predetermined amount of time, or number of words, before and/or after the topic or speaker.

FIG. 5 is an illustration of a user interface 500 for a notification for a partial, selective, and/or remote attendee as described herein in accordance with one or more embodiments of the present disclosure. With a user interface 500 such as that illustrated in FIG. 5, a use may be notified of the satisfaction of the user's condition for joining the event and may be provided with a way to join or spectate the event. When a condition set by a partial, selective, and/or remote attendee has been met, a notification may be displayed on a user device such as a smartphone or a personal computer. The notification may be similar to the user interface 500 of FIG. 5.

The user interface 500 for a notification may comprise an indication of the condition having been met. For example, if a user has requested to join an event upon a particular speaker speaking, the user interface may include a message that the speaker is speaking. The user interface 500 may also include one or more graphical user interface elements enabling a user to choose between a number of options.

For example, a GUI element may enable the user to join the event via a live video application, join the event via an audio-only connection, view a live transcription. A user may also be provided an option via a user interface 500 to receive one or more post-event data formats. For example, a user may request a complete or edited transcription, audio, and/or video be sent to the user after the event.

In some embodiments, a user can configure the default way they would like to be pulled into a meeting when their specified criteria of keyword or phrase or other condition is met. A user may in some embodiments be brought into the meeting automatically. For example, the user's computer may automatically join the event. In some embodiments, the user may be brought in upon request by an organizer of the event. For example, if one or more users have requested to be brought in upon discussion of a particular topic, the organizer may determine the topic is being discussed and add the users to the event.

Figure 6:
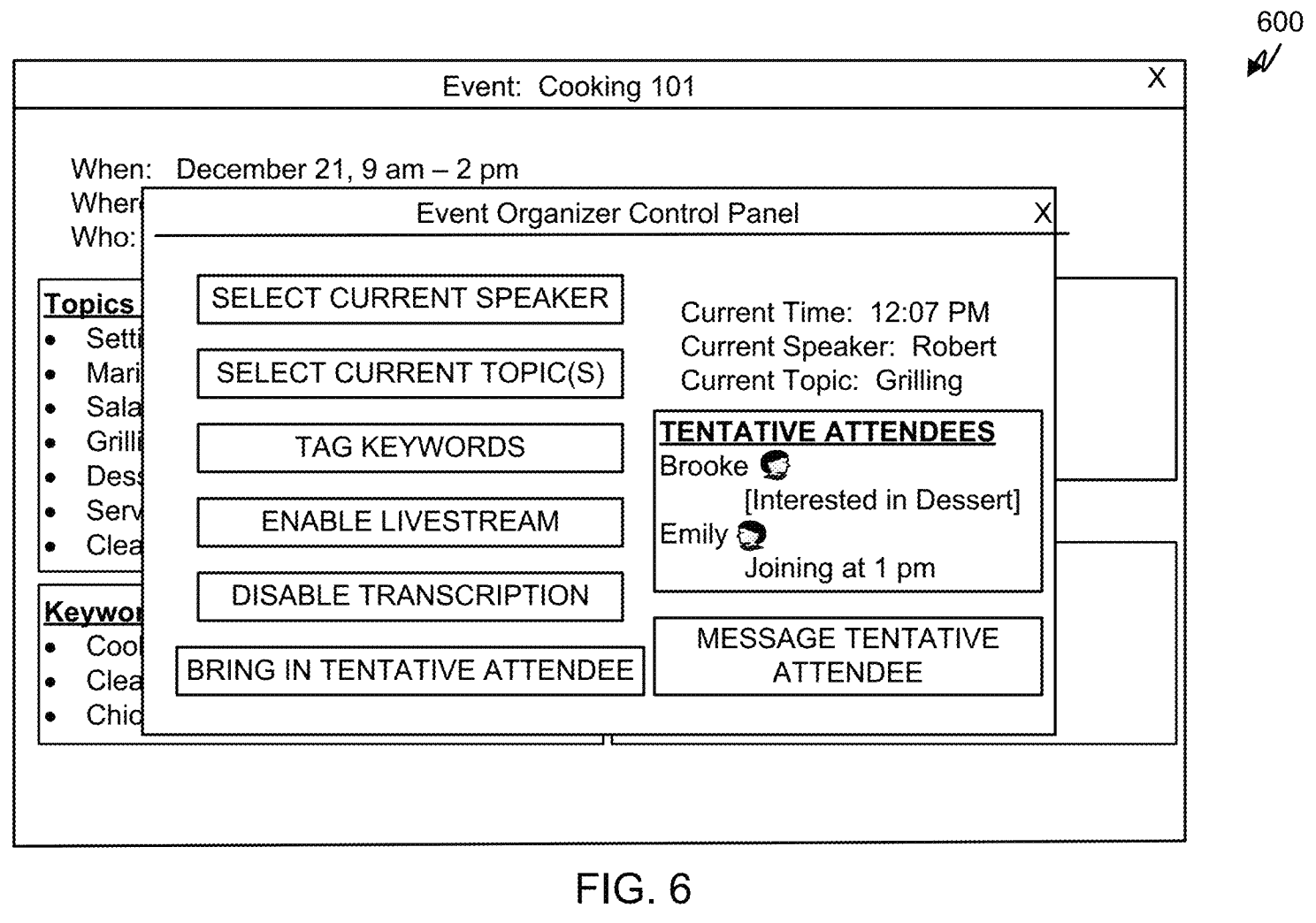

For an organizer to bring in users during an event, the organizer may use an organizer control panel user interface 600 such as that illustrated in FIG. 6. An organizer control panel UI may in some embodiments include a number of graphical user interface elements enabling the organizer, or another user, to select between a number of options. The organizer control panel UI may include a GUI element enabling a user to select a current speaker. The select current speaker GUI element may be a drop-down menu or a text box or other system for choosing a text string identifying a current speaker or speakers.

The organizer control panel UI may include a GUI element enabling a user to select a current topic. The select current topic GUI element may be a drop-down menu or a text box or other system for choosing a text string identifying a current topic or topics.

The organizer control panel UI may include a GUI element enabling a user to tag keywords. Tagging keywords may comprise typing or selecting a word or phrases identifying a current discussion. The tags may be stored in memory along with a current time such that the tags may be linked to a recording or transcript of the event.

The organizer control panel UI may include a GUI element enabling a user to enable or disable livestream. For example, an organizer may desire only a particular portion of the event be livestreamed. Using an organizer control panel, the organizer may be enabled to allow or disallow or enable or disable a livestream of the event. The organizer may be enabled to activate video broadcasting or allow only audio streaming. Similarly, the organizer control panel may be used to enable or disable transcription streaming during the event.

The organizer control panel UI may include a GUI element enabling a user to interact with attendees such as those attendees haven chosen to join an event only for a particular topic or based on another condition. For example, the organizer control panel may be used to bring in a tentative attendee, message a tentative attendee, and view tentative attendees along with their attendance condition, or selected topic/keyword/speaker, etc.

The organizer control panel UI may also include a UI display enabling a user to view a current time, topic, speaker, etc.

Figure 7:
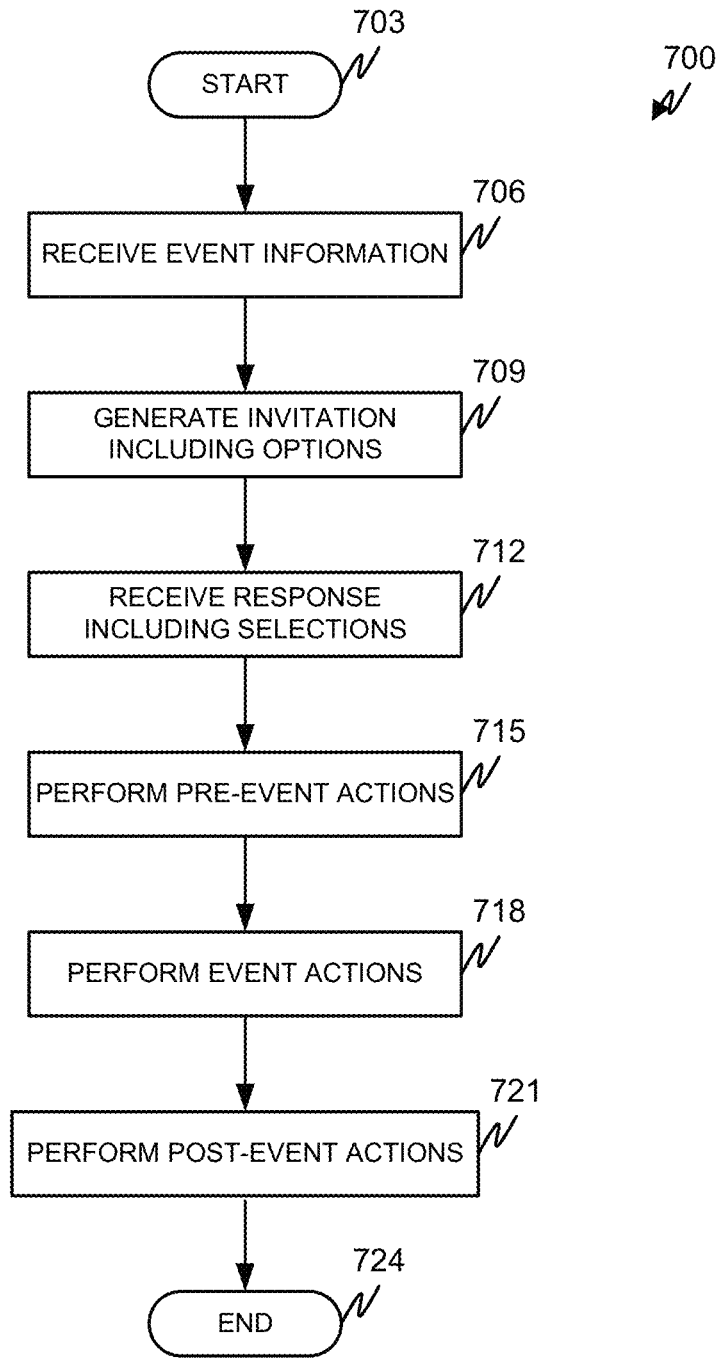
FIG. 7 is a flowchart of a method in accordance with one or more embodiments of the present disclosure.

FIG. 7 is a flowchart of a method 700 in accordance with one or more embodiments of the present disclosure. The method 700 may begin at step 703 in which an organizer of an event may interact with a computing device and create a calendar item using a calendaring application.

At 706, the computing system may receive event information. For example, the organizer may input information such as that illustrated in FIG. 3. The event information may include, but should not be considered as being limited to, starting and ending dates and times, schedule and/or listing of topics, listing of keywords, speaker list or schedule, etc.

At 709, an invitation may be generated by the computing system. Generating the invitation may comprise creating an invitation based on the event information input by the organizer. The invitation may be similar to that illustrated in FIG. 4A. After the invitation has been created, the invitation may be automatically sent to each invitee.

At 712, responses may be received from one or more of the invitees. The responses may include selections of keywords, topics, speakers, etc. such as illustrated and described herein in relation to FIGS. 4B and 4C.

If a recording or transcription is requested by an invitee, the organizer may in some embodiments be notified and may be given the opportunity to grant approval. In some embodiments, approval may be given on a case-by-case basis. For example, the organizer may allow only certain users to spectate remotely or receive a live video. As an option, when a person asks for a recording of a meeting, other participants who have or have not already responded may be presented with a new option to respond to also receive the recording. Partial permission can be granted as well. For example, the organizer may allow for audio recordings but not video. If a recording is allowed, once the meeting is over, the link of the recording may in some embodiments be sent to all participants.

At 715, based on the responses from the invitees, one or more pre-event actions may be performed. For example, an organizer user interface may be created. The organizer user interface may, as discussed herein, enable an organizer to perform a number of actions relating to an event such as bring attendees into the event, view what each attendee is interested in, create tags, begin or end a recording, view and select current topics, etc.

At 718, based on the responses from the invitees, one or more actions may be performed during an event. For example, a live transcription may be automatically generated. When a meeting starts, users who have requested a live transcription or other type of remote attendance may be represented to other participants of the event by an avatar.

Audio during the event may be received by computer devices participating in the event may be received by a server. The server may be configured to transcribe the audio received from users. The server may send, in or near real-time, each transcribed line to users via a user's preferred IM channel, such as Slack, Skype, Avaya Spaces, etc.

Similarly, a live audio/video stream may be generated and may be, if requested by a user, recorded. If a participant has requested a recording, the event may be automatically recorded. If a user has requested for a recording of only portions of an event relating to a particular topic, the meeting may be either recorded only for topics of interest, or it can be completely recorded, and then parsed automatically to send parts as selected to participants.

In some embodiments, the meeting can be livestreamed to users using any IM app, such as Slack, Microsoft Skype, etc. If a user has requested to join an event for only portions of the event relating to one or more particular keywords, when the keywords that the user has expressed interest in are encountered in the transcription, the user can be prompted to join the meeting, or may be automatically pulled in the event. In some embodiments, when a user is referenced by any other user, the user can be prompted by a conference client app to optionally join the event.

Detecting keywords, topics, and speakers may be based on a transcript of the event. For example, a speech analysis system may be used to create the transcript and a text analysis system may be used to determine whether any particular topic or keyword has been mentioned. A user may be notified when the requested topic or keyword has been mentioned via a notification. A portion of the transcript including the topic or keyword can be shown in the message prompt of the notification.

In some embodiments, a user may, upon satisfaction of a condition, be switched from a remote viewing mode to be an active participant in the event, as well as be switched from an active speaker to a remote viewer. Prior to a selective mode user joining an event, the user may be displayed in the event as an avatar. When the selective mode user joins the event, the user's camera may be enabled, and the user's avatar may be replaced with a live video feed. The user can later switch back to the Avatar mode or exit the meeting.

During the event, when a user-requested topic or keyword has been mentioned or a requested speaker has begun speaking, a notification such as that illustrated in FIG. 5 may be generated as sent to any requesting users.

During the event, a computer device associated with the organizer or another user participating in the event may display an organizer control panel such as that illustrated in FIG. 6. Using the organizer control panel, the organizer or another user may be informed as to which topics or keywords a selective participant is interested. If a user specifically requests the organizer to pull him/her in the event when a specific topic is going to get discussed, the organizer may be enabled to click on a GUI button or otherwise interact with a GUI element to bring in or notify the user. After which the specified user may be prompted to join the event.

As 721, one or more post-event actions may be automatically performed. For example, a transcription or recording created during the event may be analyzed to detect keywords, phrases, topics, and speakers. Based on the detection of keywords, phrases, topics, and speakers, and based on requested post-event transcriptions and/or recordings, edited transcriptions and/or recordings may be generated.

Any generated edited transcriptions and/or recordings or full transcriptions or recordings may be sent to requesting users after the event. In some embodiments, versions of transcriptions and/or recordings may be posted to a file sharing website with identifying features such as metadata explaining what topics, keywords, phrases, speakers, etc. are covered by the transcription or recording.

When an event ends, any recording or transcription created during the event may be saved to a data storage location, for example on a server. A hyperlink to the location may be sent to either requesting users or all participants.

Users having chosen a selective attendance option may also be sent specific sections of the recording, for example when the topic the user has specified is detected in the transcription. In some embodiments, clearly marked segments may be provided in the recording.

In the event of a user requesting a recording or transcription of only specific segments of an event, for example segments of an event relating to a particular speaker, topic, keywords, and/or phrases, a buffer may be used in the editing of the recording or transcription. For example, a number of minutes prior to and following the utterance of the requested topic, keyword, or phrase; prior to and following the scheduled discussion of the requested topic; prior to and following the scheduled speaking of the requested speaker; prior to and following the detection of the speaking of the requested speaker; etc.; may be included in the edited recording and/or transcription to ensure a satisfactory amount of data is included in the edited recording and/or transcription. The amount of time of the buffer may in some embodiments be configured as a specific number of time, for example two minutes, or may be based on other factors, such as length of time the topic is being discussed or the length of time the speaker is detected as speaking.

As an example, if a topic requested by a user having chosen to participate selectively in an event was detected to have been began to be discussed in the event at 15 minutes and 50 seconds and detected as being ceased to be discussed at 20 minutes and 20 seconds, and the amount of buffer time is set at one minute. 15.50 minutes, and stopped at 20.20 minutes, and BNM is 1. A recording segment may be created for the topic and may contain audio and video from 14 minutes and 50 seconds to 21 minutes and 20 seconds for a total of six minutes and 30 seconds. In some embodiments, a recording of the entire event may be created with annotations to show where the topic is discussed. In some embodiments, a recording of a segment where the requesting user participated and exited the event with or without buffer time may also or alternatively be created. The requesting user can be sent (i) a link to the six minutes and 30 seconds recording in which the requested topic is discussed; (ii) a link to a recording of the entire meeting, which has segments marked, according to the topic's discussed; and (iii) a link to a recording of a segment where the requesting user participated and exited the event with or without buffer time. At 724, the method 700 may end.

As an example, consider a user requesting a live transcription, a live video stream, a live audio-video stream, and/or a live audio-only stream of an event for only portions of the event in which one or more particular topics are discussed. A method such as that discussed above with regards to FIG. 7 may begin upon the event organizer creating the calendar item relating to the event.

The user may respond to the invitation by requesting the live transcription, live video stream, live audio-video stream, and/or live audio-only stream of the event and may specify the user is only interested in portions of the event in which the one or more particular topics are discussed.

During the event, the audio of the event may be monitored by a monitoring system. When the requested topic is discussed or scheduled to be discussed, the requested live transcription, live video stream, live audio-video stream, and/or live audio-only stream may be initiated. The user may be notified that the stream has begun and may be sent a notification including one or more GUI elements enabling the user to view the stream. The user may also be provided an option to download the recording or saved transcript after the event ends or as soon as the discussion of the topic has ended.

In some embodiments, each time the requested topic is tagged, detected, or scheduled, the audio, video, or live transcription may begin streaming for a predetermined amount of time, or an artificial intelligence system may be used to determine whether the requested topic is being addressed.

Similarly, if a user requests a post-meeting transcription, video, and/or audio of the event relating only to one or more requested topics, the user may not be notified during the event or provided a way to stream the event live and may instead be sent a link to the saved transcription or recording including the portion or portions of the event relating to the requested topics with or without buffer time.

As another example, consider a user requesting to live stream or view a live transcript for an event only during a particular time window. Such a user may desire to watch a pre-scheduled portion of the event. For example, the organizer may have input a schedule in the calendar item. In such a scenario, the user may receive notification including a link to a live stream or live transcription which may begin at the beginning of the time window or a predetermined amount of time prior to the time window. At the end of the time window, or a predetermined amount of time following the time window, the stream may optionally end. After, the user may be provided an opportunity to download or save the recording and/or transcription.

Similarly, if a user requests a post-meeting transcription, video, and/or audio of the event for only a particular time window, the user may not be notified until after the time window and may at that point be provided the opportunity to download or save the recording and/or transcription.

It should be appreciated that any number of combinations of the methods and systems described herein may be implemented to provide users efficient and user-friendly ways to attend events or to receive post-event information. The examples provided herein should not be considered as limiting the possible features in any way.

Embodiments of the present disclosure include a method comprising: method comprising: generating an electronic calendar item associated with an event; generating an invitation associated with the electronic calendar item, the invitation comprising: a first option associated with one or more of conditional attendance and a portion of desired attendance; and a second option associated with one or more of a type of attendance; sending the invitation; receiving a response to the invitation, the response comprising a selection associated with one or more of the first option and the second option; and based on the selection, performing one or more actions associated with the event.

Aspects of the above method include wherein the first option comprises one or more of a time range and a topic.

Aspects of the above method include wherein the second option comprises a request for one or more of a live transcription, a post-event transcription, a live recording, and a post-event recording.

Aspects of the above method include wherein the one or more actions are performed one or more of during and after the event.

Aspects of the above method include wherein the one or more actions comprise one or more of performing a live transcription and creating a recording of the event.

Aspects of the above method include wherein the one or more actions comprise editing one or more of a live transcription and a recording of the event.

Aspects of the above method include wherein in response to the first selection comprising a desired topic, the method comprises: detecting a mention of the topic during the event; and in response to the detection of the mention, sending a notification to the user.

Aspects of the above method include wherein in response to the first selection comprising a conditional acceptance based on attendance of a person, the method comprises: detecting the person is not attending the event; and in response to the detection of the person not attending the event, sending a follow-up invitation.

Aspects of the above method include wherein in response to the first selection comprising a desired topic and the second selection comprising a request for a post-event transcription, the method comprises: generating a transcription during the event; and after the event, editing the transcription to remove portions of the transcription not relating to the desired topic.

Aspects of the above method include wherein in response to the first selection comprising a desired topic and the second selection comprising a request for a live transcription, the method comprises: detecting a mention of the topic during the event; and in response to detecting the mention of the topic, generating a notification comprising a hyperlink directed to a location of a live transcription.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infrared data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method comprising:
generating an electronic calendar item associated with an event;
generating an invitation associated with the electronic calendar item, the invitation comprising:
a first option enabling a user to selectively attend at least a portion of the event; and
a second option enabling the user to select a type of attendance based on a response to the first option, the type of attendance comprising one or more of receiving a live transcription of the event, receiving a post-event transcription, receiving a live recording, and receiving a post-event recording;
sending the invitation to the user;
receiving, from the user, a response to the invitation, the response comprising a selection associated with one or more of the first option and the second option; and
based on the selection, performing one or more actions associated with the event.

2. The method of claim 1, wherein the first option enables the user to select one or more of a time range and a topic associated with the portion of the event.

3. The method of claim 1, wherein the one or more actions are performed during the event.

4. The method of claim 1, wherein the one or more actions comprise one or more of generating a live transcription and creating a recording of the event.

5. The method of claim 1, wherein the one or more actions comprise automatically editing one or more of a live transcription and a recording of the event.

6. The method of claim 1, wherein the response comprises the selection associated with the first option, the selection indicates a desired topic, and the actions associated with the event comprise:
detecting a mention of the desired topic during the event; and
in response to the detection of the mention, sending a notification to the user.

7. The method of claim 1, wherein the response comprises the selection associated with the first option, the selection indicates a conditional acceptance based on attendance of a person other than the user, and the actions associated with the event comprise:
detecting the person other than the user is not attending the event; and
in response to detecting the person other than the user is not attending the event, sending a follow-up invitation to the user.

8. The method of claim 1, wherein the response comprises the selection associated with the first option comprising a desired topic and the selection associated with the second option comprising a request for a post-event transcription, and the actions associated with the event comprise:
generating a transcription during the event; and after the event, automatically editing the transcription to remove portions of the transcription not relating to the desired topic.

9. The method of claim 1, wherein the response comprises the selection associated with the first option comprising a desired topic and the selection associated with the second option comprising a request for a live transcription, and the actions associated with the event comprise:

detecting a mention of the desired topic during the event; and in response to detecting the mention of the desired topic, generating a notification comprising a hyperlink directed to a location of a live transcription.

10. A computer system comprising:

a processor; and a computer-readable storage medium storing computer-readable instructions which, when executed by the processor, cause the processor to execute a method, the method comprising:

generating an electronic calendar item associated with an event;

generating an invitation associated with the electronic calendar item, the invitation comprising:

a first option enabling a user to selectively attend at least a portion of the event; and a second option enabling the user to select a type of attendance based on a response to the first option, the type of attendance comprising one or more of receiving a live transcription of the event, receiving a post-event transcription, receiving a live recording, and receiving a post-event recording;

sending the invitation to the user;

receiving, from the user, a response to the invitation, the response comprising a selection associated with one or more of the first option and the second option; and based on the selection, performing one or more actions associated with the event.

11. The computer system of claim 10, wherein the first option enables the user to select one or more of a time range and a topic associated with the portion of the event.

12. The computer system of claim 10, wherein the one or more actions are performed during the event.

13. The computer system of claim 10, wherein the one or more actions comprise one or more of generating a live transcription and creating a recording of the event.

14. The computer system of claim 10, wherein the one or more actions comprise automatically editing one or more of a live transcription and a recording of the event.

15. The computer system of claim 10, wherein the response comprises the selection associated with the first option, the selection indicates a desired topic, and the actions associated with the event comprise:

detecting a mention of the desired topic during the event; and in response to the detection of the mention, sending a notification to the user.

16. The computer system of claim 10, wherein the response comprises the selection associated with the first option, the selection indicates a conditional acceptance based on attendance of a person other than the user, and the actions associated with the event comprise:

detecting the person other than the user is not attending the event; and in response to detecting the person other than the user is not attending the event, sending a follow-up invitation to the user.

17. The computer system of claim 10, wherein the response comprises the selection associated with the first option comprising a desired topic and the selection associated with the second option comprising a request for a post-event transcription, and the actions associated with the event comprise:

generating a transcription during the event; and after the event, automatically editing the transcription to remove portions of the transcription not relating to the desired topic.

18. A computer program product comprising:

a non-transitory computer-readable storage medium having computer-readable program code embodied therewith, the computer-readable program code configured, when executed by a processor of a first user device, to execute a method, the method comprising:

generating an electronic calendar item associated with an event;

generating an invitation associated with the electronic calendar item, the invitation comprising:

a first option enabling a user to selectively attend at least a portion of the event; and a second option enabling the user to select a type of attendance based on a response to the first option, the type of attendance comprising one or more of receiving a live transcription of the event, receiving a post-event transcription, receiving a live recording, and receiving a post-event recording;

sending the invitation to the user;

receiving, from the user, a response to the invitation, the response comprising a selection associated with one or more of the first option and the second option; and based on the selection, performing one or more actions associated with the event.

19. The computer program product of claim 18, wherein the first option enables the user to select one or more of a time range and a topic associated with the portion of the event.

20. The computer program product of claim 18, wherein the one or more actions are performed during the event.

* * * * *